H. J. HAMMOND.
Improvement in Tea and Coffee Pots.
No. 119,352.
Patented Sep. 26, 1871.
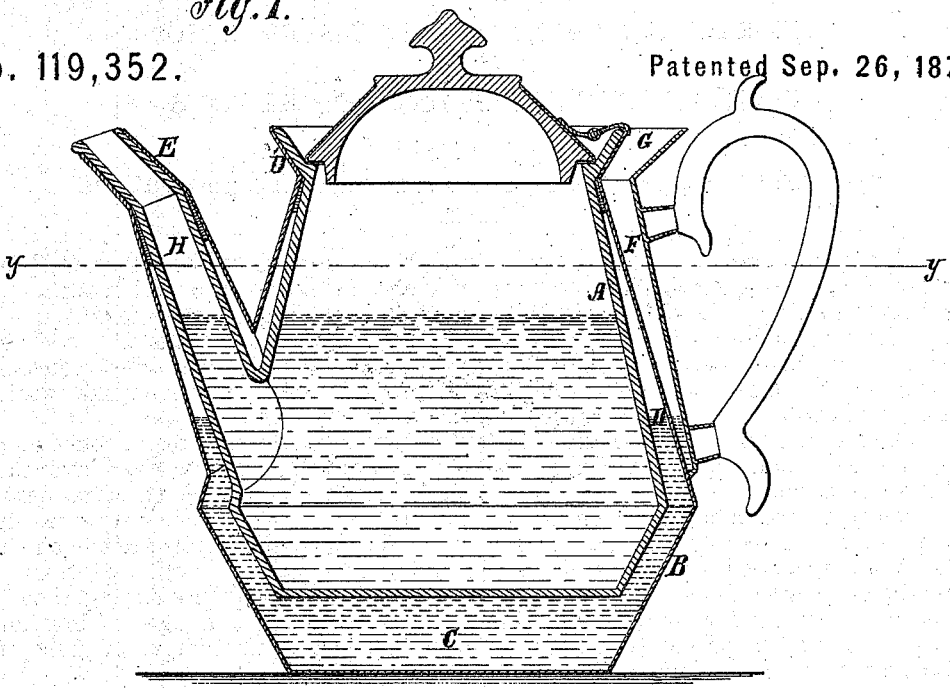
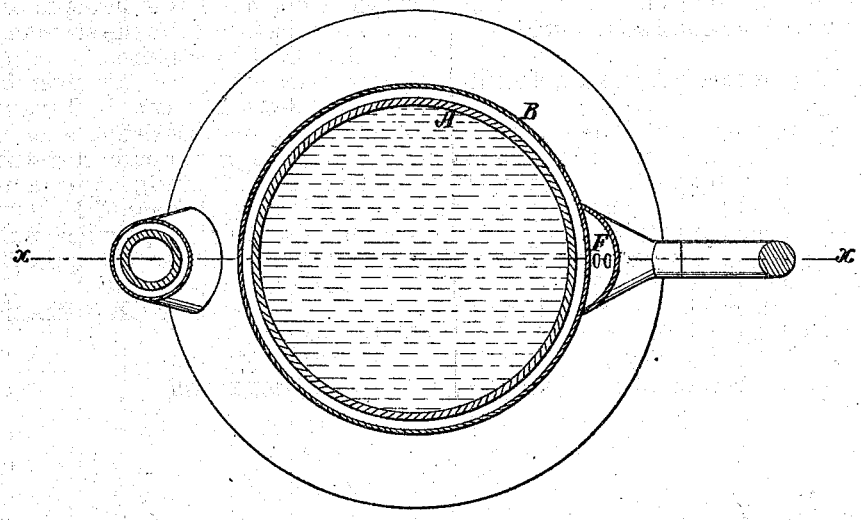

UNITED STATES PATENT OFFICE.

HORACE J. HAMMOND, OF NEWBURG, OHIO.

IMPROVEMENT IN TEA-AND-COFFEE POTS.

Specification forming part of Letters Patent No. 119,352, dated September 26, 1871.

*To all whom it may concern:*

Be it known that I, HORACE J. HAMMOND, of Newburg, in the county of Cuyahoga and State of Ohio, have invented a new and Improved Tea-and-Coffee Pot; and I do hereby declare that the following is a full, clear, and exact description thereof, which will enable others skilled in the art to make and use the same, reference being had to the accompanying drawing forming part of this specification.

My invention relates to an improvement in tea-and-coffee pots; and it consists in having an earthenware pot surrounded with a metallic pot made larger than the earthen one, to have a water-space under and around it for containing water to heat it, so that the tea or coffee will not be liable to be overheated, as it is when in a vessel without a jacket placed on the stove or fire. At the same time the earthen pot removes the well-known objections against steeping the tea or coffee in metallic pots, and it is preserved from breaking by the metal pot.

Figure 1 is a sectional elevation of my improved pot, the section being on the line $x\,x$ of Fig. 2; and Fig. 2 is a horizontal section taken on the line $y\,y$ of Fig. I.

Similar letters of reference indicate corresponding parts.

A is the earthenware pot, and B the metallic pot surrounding it. The latter is made enough larger than the former to provide a sufficient water-space, C D, around the bottom and sides of it for holding a sufficient quantity of water to convey heat to it and prevent heating it above the boiling-point. At D' the two vessels are to be fitted snugly together; also at E; and India rubber or other packing may be introduced to prevent the escape of the water when the pot is tilted for pouring out the tea or coffee. The water will be introduced to the space C through the passage F, having a funnel mouth, G, and arranged on the side opposite to that on which the spout H is, so that the mouth G will always be higher than any other part when pouring out the tea or coffee, and thus prevent the water in space C D from running out.

It is well known that tea or coffee prepared in earthenware vessels has a better flavor than when made in metal pots; also, that the heat will be retained longer after being removed from the stove; but as earthen pots are much more liable to be broken, they are not so generally used as they would be. Now, by having them incased in metal jackets, the danger of breaking is removed, and the advantages of them are made more available.

The metallic case is a protection against danger of breaking the earthern pot by coming in violent contact with the other articles, and the intervening water not only prevents the tea or coffee from being overheated, but is also a protection to the earthen from danger of breaking from excess of heat, as is liable to earthen pots when so exposed without the surrounding water to regulate the temperature.

Having thus described my invention, I claim as new and desire to secure by Letters Patent—

A tea or coffee-pot, consisting of an inner earthenware vessel, A, and an outer metallic vessel, B, the latter being sufficiently larger than the former to provide a water-space, C D, between them, except at D' and E, and provided with a filling-passage, F, placed on the side opposite the spout H, all substantially as specified.

HORACE J. HAMMOND.

Witnesses:
GEO. W. RUGG,
J. A. MATHEWS. (51)